(12) United States Patent
Salesse-Lavergne

(10) Patent No.: US 7,558,653 B2
(45) Date of Patent: Jul. 7, 2009

(54) AUTOPILOT SYSTEM FOR A HELICOPTER

(75) Inventor: Marc Salesse-Lavergne, Marseille (FR)

(73) Assignee: Eurocopter, Marignane (FR)

( * ) Notice: Subject to any disclaimer, the term of this patent is extended or adjusted under 35 U.S.C. 154(b) by 74 days.

(21) Appl. No.: 11/246,154

(22) Filed: Oct. 11, 2005

(65) Prior Publication Data
US 2006/0100751 A1 May 11, 2006

(30) Foreign Application Priority Data
Oct. 8, 2004 (FR) .................................. 04 10611

(51) Int. Cl.
*G05D 1/08* (2006.01)
*G05D 3/20* (2006.01)
*G06F 7/02* (2006.01)
*G06F 19/00* (2006.01)
*B64C 27/04* (2006.01)
*B64C 27/54* (2006.01)
*B64C 27/57* (2006.01)
*B64C 13/00* (2006.01)

(52) U.S. Cl. .................. 701/11; 701/4; 701/36; 701/48; 701/99; 701/102; 340/146.2; 244/17.11; 244/17.13; 244/75.1; 244/99.2; 244/198

(58) Field of Classification Search ............... 244/17.11, 244/17.13, 17.25, 76, 234, 236; 701/1, 4, 701/5, 11
See application file for complete search history.

(56) References Cited

U.S. PATENT DOCUMENTS

| 3,927,306 | A | * | 12/1975 | Miller | 701/15 |
|---|---|---|---|---|---|
| 4,129,275 | A | * | 12/1978 | Gerstine et al. | 244/181 |
| 4,168,045 | A | * | 9/1979 | Wright et al. | 244/17.13 |
| 4,222,272 | A | * | 9/1980 | Mairson | 73/504.03 |
| 4,471,439 | A | * | 9/1984 | Robbins et al. | 701/5 |
| 4,564,908 | A | * | 1/1986 | Clelford et al. | 701/8 |
| 4,628,455 | A | * | 12/1986 | Skutecki | 701/7 |
| 4,807,129 | A | * | 2/1989 | Perks | 701/3 |
| 4,947,334 | A | * | 8/1990 | Massey et al. | 701/3 |
| 5,076,517 | A | * | 12/1991 | Ferranti et al. | 244/228 |
| 5,141,177 | A | * | 8/1992 | Wright et al. | 244/17.13 |
| 5,428,543 | A | * | 6/1995 | Gold et al. | 701/5 |
| 5,608,630 | A | * | 3/1997 | Poelouev | 701/36 |
| 5,676,334 | A | * | 10/1997 | Cotton et al. | 244/17.13 |
| 5,730,394 | A | * | 3/1998 | Cotton et al. | 244/180 |
| 5,738,300 | A | * | 4/1998 | Durand | 244/17.13 |
| 5,971,325 | A | * | 10/1999 | Gold et al. | 244/180 |
| 6,059,225 | A | * | 5/2000 | Vidal et al. | 244/17.13 |
| 6,059,255 | A | * | 5/2000 | Rosen et al. | 244/17.13 |
| 6,259,975 | B1 | * | 7/2001 | Rollet et al. | 701/3 |
| 6,367,741 | B2 | * | 4/2002 | Mezan | 244/195 |
| 6,648,269 | B2 | * | 11/2003 | Gold et al. | 244/17.13 |
| 7,085,655 | B2 | * | 8/2006 | Ferrer | 702/35 |
| 2003/0066926 | A1 | * | 4/2003 | Salesse-Lavergne | 244/17.13 |

(Continued)

*Primary Examiner*—Jack W. Keith
*Assistant Examiner*—Jonathan M Dager
(74) *Attorney, Agent, or Firm*—Young & Thompson

(57) ABSTRACT

The present invention relates to an autopilot system for a rotary wing aircraft operating relative to at least two pilot axes, which system comprises, for each of the two axes, at least one servo-control relationship providing a respective initial control instruction, with the two relationships having a common target; the system includes combination means (36) for providing a series of control instructions by combining the two initial control instructions (UCV, UTV).

5 Claims, 3 Drawing Sheets

U.S. PATENT DOCUMENTS

2003/0066927 A1* 4/2003 Salesse-Lavergne ..... 244/17.13
2003/0191561 A1* 10/2003 Vos .............................. 701/3
2005/0004723 A1* 1/2005 Duggan et al. ................ 701/24
2005/0045762 A1* 3/2005 Pham ........................ 244/7 R

* cited by examiner

AUTOPILOT SYSTEM FOR A HELICOPTER

The present invention relates to an autopilot system for a rotary wing aircraft, in particular for a helicopter.

The technical field of the invention is that of manufacturing autopilot systems for helicopters.

BACKGROUND OF THE INVENTION

In general, a rotary wing aircraft is piloted by adjusting the cyclic pitch and the collective pitch of at least one main rotor for providing lift and forward advance, and by adjusting operating parameters of a tail rotor (in particular its collective pitch).

More generally, piloting takes place along pilot axes: roll axis, tilt (pitch) axis, yaw axis, and "collective" axis corresponding to adjusting the collective pitch of the blades of the main rotor.

These adjustments are performed by actuators controlled by a computer; the instructions for controlling actuators as issued by the computer of the autopilot (referred to below as "AP"), are generated on the basis of setpoint values selected by the pilot as a function of the stage of flight to be undertaken, and as a function of values for state parameters of the aircraft, such as its altitude or its air speed, as delivered by on-board sensors.

For this purpose, the computer is programmed to apply servo-control relationships enabling the state parameters of the aircraft to be servo-controlled as a function of the setpoints—or targets—selected by the pilot of the aircraft.

The AP may include one or more target relationships for a given pilot axis.

In particular, for piloting about the tilt axis, the AP may have a vertical target first relationship seeking to cause a state parameter of the helicopter to reach and maintain a setpoint for this parameter, with this relationship being used to issue an instruction to cause the main rotor to tilt; the AP described in patents FR 2 830 631 and U.S. Pat. No. 6,691,950 also including, for the tilt axis, a second relationship seeking to limit air speed relative to two limit values (maximum and minimum authorized air speeds); in order to switch from one relationship to another as a function of the actual air speed of the helicopter, the AP includes a set of comparators and selectors; that configuration makes it possible to manage longitudinal or tilt control of the main rotor automatically.

For piloting the collective axis, the AP described in that document further includes a vertical target relationship and a relationship for maintaining the power at the maximum authorized value, together with a selector to select the power relationship when the air speed reaches the maximum value compatible with maintaining the vertical target and with the maximum authorized power.

The AP described in patent applications FR 2 830 630 and US 2003 066927 has two target relationships for the tilt axis and two target relationships for the collective axis; first selector means select a vertical target relationship for the collective axis during normal operation of the helicopter and switch, for this axis, to a relationship for maintaining power when the power becomes insufficient to maintain an air speed setpoint; second selector means select a forward-advance target (or setpoint) relationship for the tilt axis when the vertical target relationship is selected for the collective axis, and switches, for the tilt axis, to a vertical target relationship when the first selector means select the power-maintaining relationship.

In autopilot systems for rotary wing aircraft that provide for switching from a first relationship to a second relationship for controlling an axis, the switchover can give rise to troublesome jumps, beats, or oscillations.

An object of the invention is to remedy that drawback.

An object of the invention is to propose an autopilot system for a rotary wing aircraft that is improved and/or that remedies, at least in part, the drawbacks of known systems for automatically piloting such aircraft.

SUMMARY OF THE INVENTION

The invention applies to a system for automatically piloting a rotary wing aircraft relative to at least two pilot axes, the system comprising, for each of the two axes, at least one servo-control relationship supplying a respective initial control instruction, the two relationships having a common target; the autopilot system of the invention includes combination means for forming a (substantially continuous and infinite) series of control instructions by combining the two initial control instructions.

In another aspect, the invention consists in proposing an autopilot system for a rotary wing aircraft relative to a tilt axis and to a collective pitch axis, the system comprising:

a first servo-control module for applying a first relationship to supply an initial collective pitch control instruction (UCV); and a second servo-control module for applying a second relationship supplying an initial tilt control instruction (UTV);

the first and second relationships having a common target, the system further comprising:

calculation and combination means for calculating intermediate control instructions (UICOLL, UTMIN) by combining the two initial control instructions (UCV, UTV);

a third servo-control module applying a third relationship providing a third control instruction (UTL, UCP, UTY) for tilt or for collective pitch, the third relationship having a target that is different from said common target; and selector and corrector means for selecting two control instructions from the intermediate control instructions, and where appropriate for correcting the selected control instructions, as a function of the third control instruction.

According to preferred characteristics of the invention:

said combination is (substantially) linear;

for piloting a tilt axis and a collective axis, both of the relationships supplying the initial control instructions are vertical target relationships for these axes;

the AP further comprises selector means and, where appropriate, corrector means for delivering two final control instructions from said series of control instructions obtained by combining the initial control instructions, and where appropriate for correcting them;

the selector means may include a relationship for maintaining the power that is absorbed for driving the rotor below a setpoint value;

the relationship for maintaining power has priority over other relationships via selector and/or corrector means applied to the tilt and collective pitch control instructions;

the selector means may include a relationship for maintaining aircraft air speed at a setpoint value;

the selector means may include a relationship for maintaining aircraft air speed above a predetermined value corresponding to the optimum speed for climbing;

the corrector means may include a limiter module for limiting the collective pitch control instruction as a function of a power-maintaining instruction;

the system includes a module for calculating an intermediate tilt instruction as a function of a power-maintaining instruction;

the system includes a comparator module for comparing the intermediate instruction, a tilt instruction having a forward-advance target, and a tilt instruction having an optimum air speed target or a climb target, with the final instruction selected in tilt being selected from these three instructions; and the system includes a module for calculating an intermediate collective pitch instruction as a function of a tilt instruction.

The invention makes it possible to obtain two respective control instructions for two axes by combining two initial control instructions respectively generated by two distinct servo-control relationships having a common target, in particular two vertical target relationships; this vertical target may be an altitude that is to be reached and maintained, for example.

The invention makes it possible to omit selecting between two initial control instructions, and makes it possible to eliminate the instabilities that result from switching from one relationship to another.

The invention provides piloting that is more effective and more "robust".

Other characteristics and advantages of the invention appear from the following description which refers to the accompanying drawings and which relates to preferred embodiments of the invention, without any limiting character.

DETAILED DESCRIPTION OF THE INVENTION

Figure 1:
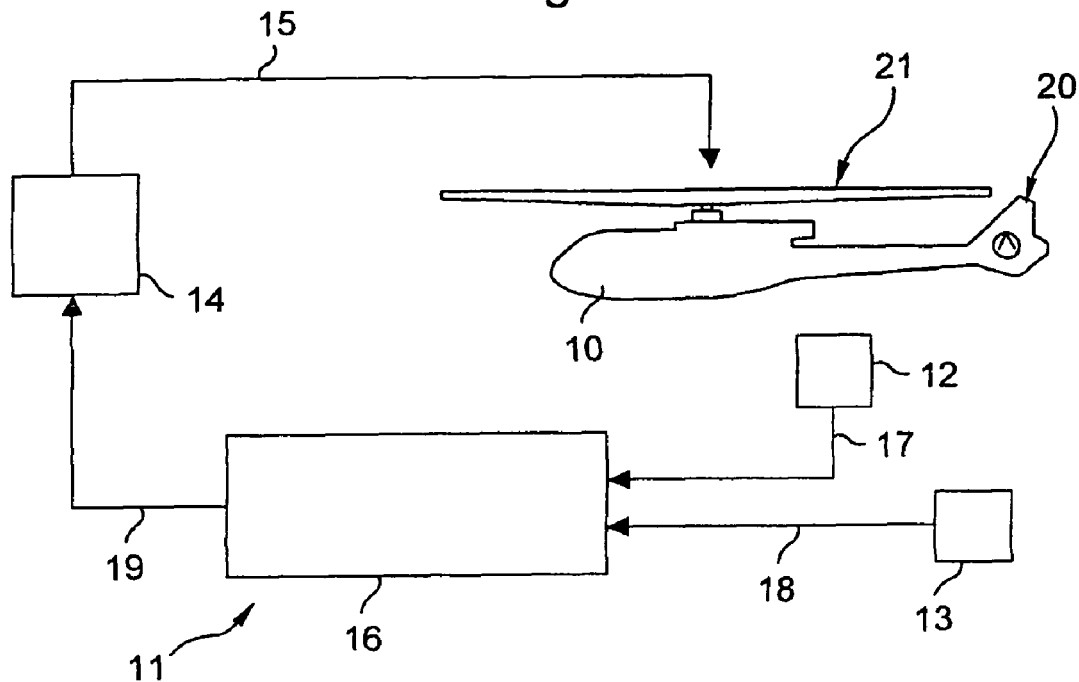
FIG. 1 is a block diagram of an autopilot system for a helicopter.

With reference to FIG. 1, the system 11 for automatically piloting the helicopter 10 has actuators 14 controlled by a computer 16 as a function of signals delivered by sensors 12 and setpoints input by a pilot of the helicopter via members 13 for inputting data into the computer.

For this purpose, connection means 17 to 19 respectively connect the sensors 12 to the computer, the members 13 to the computer, and the computer to the actuators 14.

A connection 15 connecting the actuators to the helicopter symbolizes the fact that the actuators act on members of the helicopter, in particular members for adjusting the cyclic pitch and the collective pitch of the main rotor 21 and also the collective pitch of the tail rotor 20.

Figure 2:
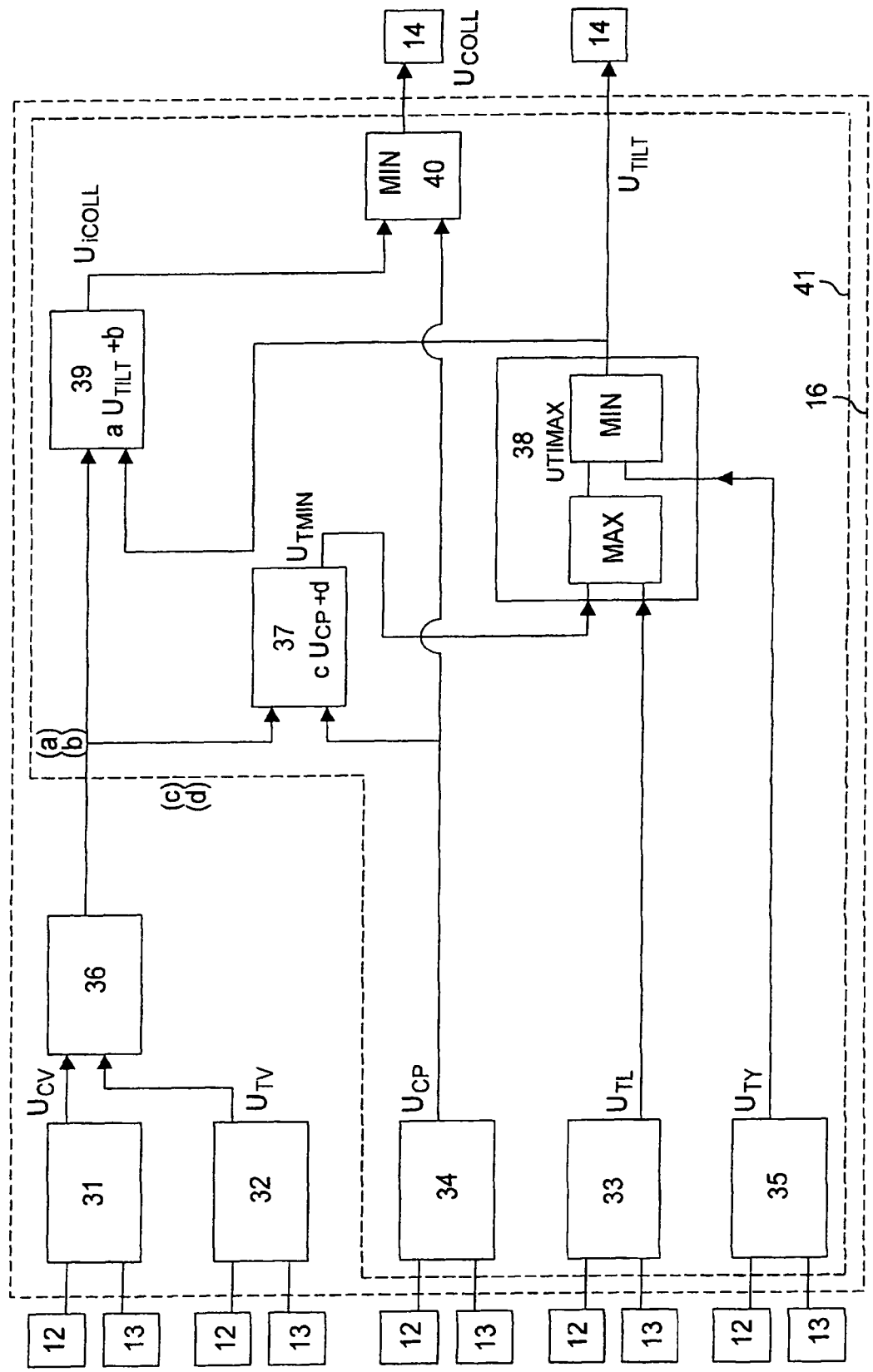
FIG. 2 is a block diagram of an autopilot computer in a system of the invention for piloting a tilt axis and a collective axis on the basis of five servo-control relationships.

With reference to FIG. 2, the computer 16 has five servo-control modules 31 to 35; each module issues a control instruction as a function of a servo-control relationship that is specific thereto, and as a function of signals and/or data received from the sensors 12 and the members 13 for adjusting setpoints.

To pilot the collective axis, the computer 16 issues a control signal UCOLL to an actuator 14; to pilot the tilt axis the computer 16 delivers a control signal UTILT to a servo-control system that maintains the tilt trim—i.e. the pitch attitude—via another actuator 14.

The autopilot device of the invention, which is integrated in the computer 16, generates the instructions UCOLL and UTILT from the servo-control modules 31 to 35 in the manner described below with reference to FIGS. 2 to 5.

Figure 3:
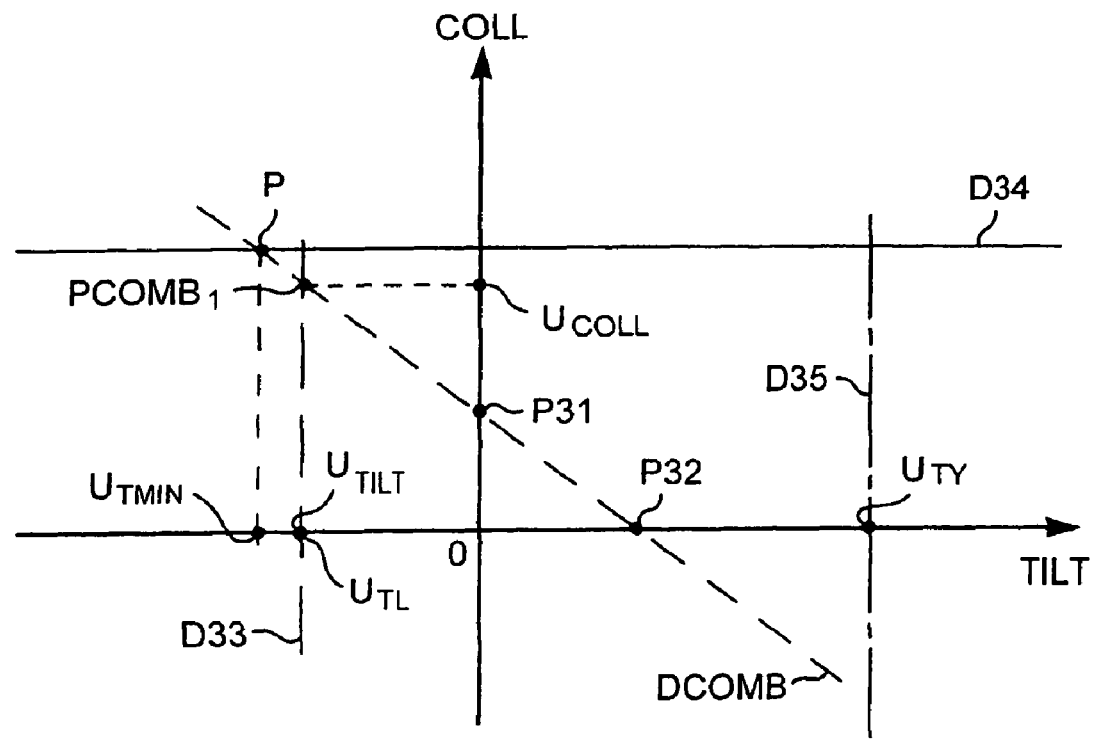
FIGS. 3 to 5 are graphs for explaining details pertaining to the implementation of the servo-control relationships in the computer corresponding to FIG. 2.
Figure 4:
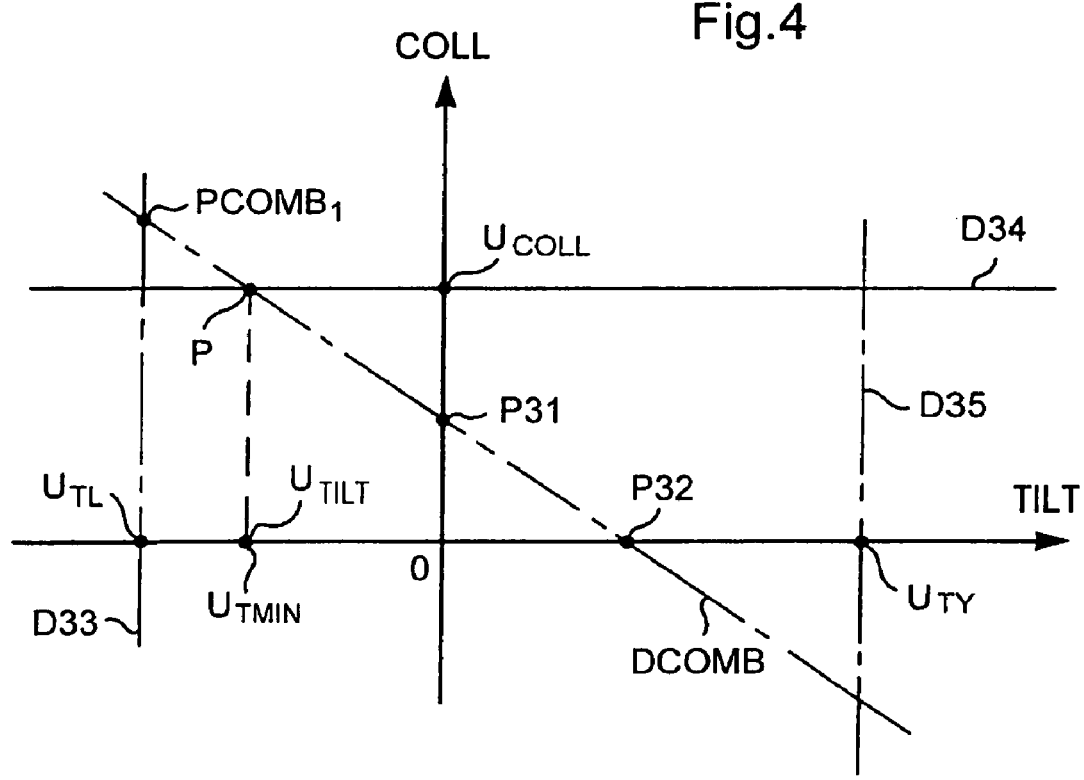
Figure 5:
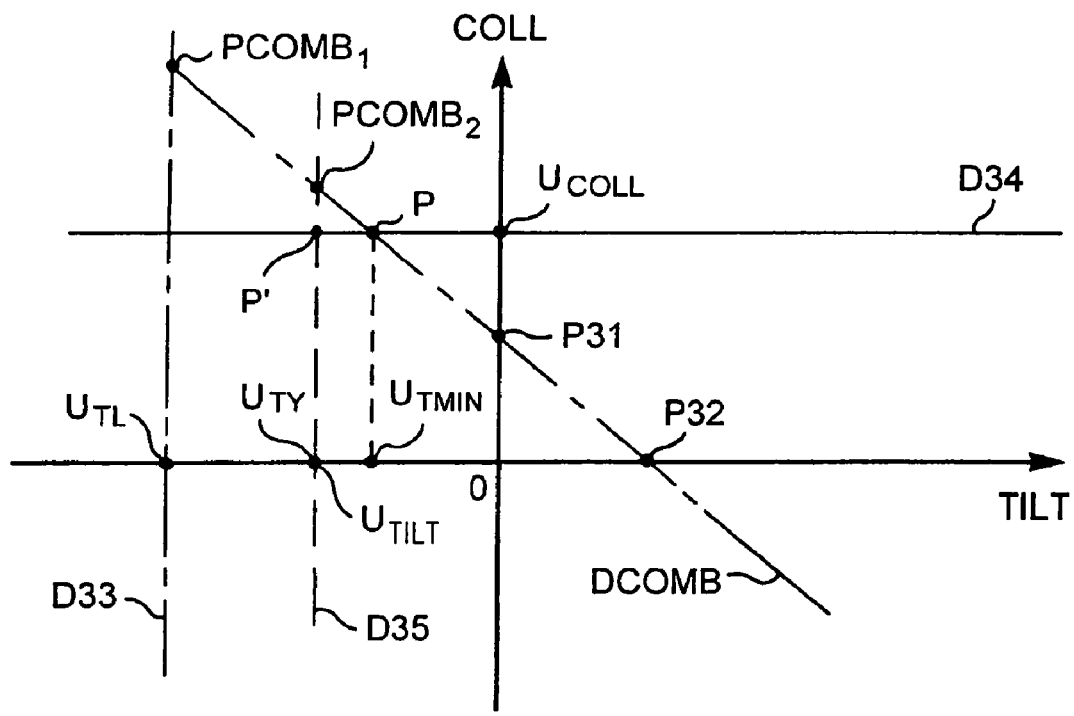

In FIGS. 3 to 5, the abscissa axis represents variation TILT in the tilt trim setpoint, and the ordinate axis represents variation COLL in the collective pitch of the main rotor.

The servo-control relationship of the module 31 is a vertical target relationship for controlling variations in collective pitch; this target may be an altitude to be reached and maintained, a rate of climb, or a vertical acceleration, for example.

The module 31 provides an initial control instruction UCV corresponding to the ordinate of the point P31 on the ordinate axis in FIGS. 3 to 5.

The servo-control relationship of the module 32 is likewise a vertical target relationship, but for controlling the tilt axis. The module 32 supplies an initial control instruction UTV corresponding to the abscissa of the point P32 on the abscissa axis of FIGS. 3 to 5.

The initial control instructions UCV and UTV are applied to inputs of a calculator module 36; this module outputs four coefficients written a, b, c, and d corresponding to two ways of writing the equation for the straight line DCOMB (shown in FIGS. 3 to 5) that passes through the points P31 and P32, i.e.:

A * TILT+b=COLL and

C * COLL+d=TILT

The coefficients a, b, c, and d are given by the following formulae:

$$a = -(UCV/UTV); b = UCV; c = -(UTV/UCV); d = UTV$$

Thus, the abscissa and the ordinate of a point on the straight line DCOMB each correspond to a linear combination of the initial control instructions (UCV or UTV) and of their ratios (UTV/UCV or UCV/UTV).

In accordance with an aspect of the invention, amongst all of the possible linear combinations corresponding to the various points on the line DCOMB, wherever possible, the selected combination is a combination that satisfies additional constraints in terms of power absorbed by the rotor and in terms of helicopter speed, with this being achieved by selector and corrector means 41 integrated in the computer.

The servo-control relationship of the module 34 is a collective axis control relationship that limits the power absorbed by the main rotor to a predetermined value.

The module 34 supplies a control instruction UCP which corresponds to the straight line D34 in FIGS. 3 to 5; this line parallel to the abscissa axis intersects the ordinate axis at a point corresponding to a maximum collective pitch increase UCP corresponding to the absorbed power that is not to be exceeded.

The servo-control relationship of the module 33 is a longitudinal-target relationship for controlling the tilt axis of the helicopter; this target may correspond in particular to a horizontal air speed setpoint for the helicopter; the module 33 supplies a tilt control instruction UTL corresponding to the straight line D33 in FIGS. 3 to 5; this line is parallel to the ordinate axis and intersects the abscissa axis at a point corresponding to the minimum value for the tilt control instruction UTL for providing the horizontal speed in question.

The servo-control relationship of the module 35 is a control relationship for the tilt axis serving to limit the air speed of the helicopter to a value corresponding to the optimum speed for climbing. The module 35 provides a tilt control instruction UTY which corresponds to the straight line D35 of FIGS. 3 to 5; this line is parallel to the ordinate axis and intersects the abscissa axis at a point corresponding to a value for the tilt control instruction that provides the optimum air speed setpoint for climbing.

With reference to FIG. 2, the selector and corrector means 41 include a module 37 for calculating an intermediate instruction UTMIN for controlling tilt on the basis of the instruction UCP delivered by the module 34 and the coefficients c and d that are calculated by the module 36 as described above.

The module 37 performs the following combination calculation:

$$UTMIN = c*UCP + d$$

which in FIGS. 3 to 5 corresponds to the abscissa of the point of intersection P between the line DCOMB and the line D34.

The instructions UTMIN and UTL are applied as inputs to an operator MAX in a selector module 38; this operator outputs the value UTIMAX which is the maximum of the values present at its inputs.

In FIGS. 3 and 4 this represents making a selection between the point of intersection P between the lines DCOMB and D34 and the point of intersection PCOMB1 between the lines DCOMB and D33, by taking the point having the greater abscissa value, i.e. the point PCOMB1 in the configuration shown in FIG. 3 and the point P in the configuration shown in FIG. 4.

The intermediate tilt control instruction UTIMAX as determined in this way is itself applied in turn together with the instruction UTY delivered by the module 35 to the inputs of an operator MIN of the module 38; this operator outputs a value UTILT that is the minimum of the values present on its inputs; this tilt control instruction UTILT is finally applied to the trim servo-control which drives the appropriate actuators 14.

Thus, when the instruction UTY is less than the intermediate instruction UTIMAX, as in the configuration shown in FIG. 5, the module MIN of the selector 38 outputs the value UTILT=UTY.

In addition, in this configuration, it is not the point of intersection PCOMB2 between the lines DCOMB and D35 that is selected, but a point of intersection P' between the lines D34 and D35 corresponding to the tilt control instruction UTY and to the collective pitch control instruction corresponding to maximum power (represented by D34).

Under such circumstances, the vertical target (corresponding to points on the line DCOMB) cannot be achieved and maintained.

These last-mentioned selections and corrections are performed by the modules 39 and 40 of the computer:

the module 39 calculates an intermediate collective control instruction UICOLL applying the formula:

$$UICOLL = a*UTILT + b$$

as a function of the coefficients a and b delivered by the module 36 and of the instruction UTILT output by the module 38; the intermediate instruction UICOLL corresponds to the ordinate of the point of intersection PCOMB2 between the lines DCOMB and D35; and the module MIN 40 compares the values of the instructions UICOLL and UCP and outputs the minimum value present on its inputs; the instruction UCOLL output by the operator 40 is applied to the actuator for adjusting the collective pitch of the main rotor.

What is claimed is:

1. An autopilot for a helicopter having at least two pilot axes, the autopilot comprising:

for each of the two axes at least one servo-control module for applying a control relationship to supply a respective initial control instruction, the two control relationships having a common target, the autopilot including a calculator module configured for calculating control instructions from the two initial control instructions to output four coefficients a, b, c, and d, wherein based upon said coefficients, said calculator module outputs intermediate instructions UICOLL=a*UTILT+b and UTMIN=c*UCP+d, where UICOLL is an intermediate collective control instruction, UTILT is an intermediate tilt control instruction, UTMIN is an intermediate instruction with a minimum value for controlling tilt and UCP is an initial control instruction calculated by one of the servo control modules from a relationship having a target different from said common target, wherein a servo-control module is configured for applying a relationship for maintaining an absorbed power for driving the rotor at a value below a setpoint value.

2. The autopilot according to claim 1, in which the two control relationships have a common vertical target, and the different target is linked to a predetermined main rotor power value.

3. The autopilot according to claim 1, in which the relationship for maintaining an absorbed power for driving the rotor takes priority over other servo-control relationships of the autopilot system.

4. The autopilot according to claim 1, in which a selector means comprise a servo-control module configured for applying a relationship for maintaining aircraft forward speed of the aircraft above a setpoint value.

5. The system according to claim 1, in which a selector means comprise a servo-control module configured for applying a relationship for maintaining aircraft air speed above a predetermined value corresponding to an optimum speed for climbing.

* * * * *